US011053669B2

(12) United States Patent
Völk et al.

(10) Patent No.: US 11,053,669 B2
(45) Date of Patent: Jul. 6, 2021

(54) SYSTEM SEPARATION DEVICE

(71) Applicant: Reinhard Völk, Jengen (DE)

(72) Inventors: Reinhard Völk, Jengen (DE); Ute Götzfried, Lamerdingen (DE)

(73) Assignee: REINHARD VÖLK

( * ) Notice: Subject to any disclaimer, the term of this patent is extended or adjusted under 35 U.S.C. 154(b) by 0 days.

(21) Appl. No.: 15/886,551

(22) Filed: Feb. 1, 2018

(65) Prior Publication Data

US 2018/0155903 A1 Jun. 7, 2018

Related U.S. Application Data

(63) Continuation-in-part of application No. PCT/EP2016/068516, filed on Aug. 3, 2016.

(30) Foreign Application Priority Data

Aug. 4, 2015 (DE) .......................... 102015112791.1

(51) Int. Cl.
| | | |
|---|---|---|
| *C02F 1/32* | (2006.01) | |
| *E03B 11/06* | (2006.01) | |
| *E03B 7/07* | (2006.01) | |
| *E03C 1/10* | (2006.01) | |

(52) U.S. Cl.
CPC .............. *E03B 7/074* (2013.01); *C02F 1/325* (2013.01); *E03B 7/078* (2013.01); *E03B 11/06* (2013.01); *E03C 1/10* (2013.01); *E03C 1/102* (2013.01); *C02F 2201/3221* (2013.01); *C02F 2209/42* (2013.01); *C02F 2303/04* (2013.01); *C02F 2305/10* (2013.01); *C02F 2307/14* (2013.01); *Y02A 20/20* (2018.01)

(58) Field of Classification Search
CPC .............. C02F 1/325; C02F 2201/3221; C02F 2209/42; C02F 2303/04; C02F 2305/10; C02F 2307/14; E03B 7/074; E03B 7/078; E03B 11/06; E03C 1/10; E03C 1/102; Y02A 20/202
See application file for complete search history.

(56) References Cited

U.S. PATENT DOCUMENTS

| | | | | |
|---|---|---|---|---|
| 5,391,297 A | * | 2/1995 | Sell .......................... | C02F 1/325 |
| | | | | 210/192 |
| 5,433,866 A | * | 7/1995 | Hoppe .................... | C02F 1/325 |
| | | | | 210/748.11 |
| 2014/0048494 A1 | * | 2/2014 | Simmons, Jr. ............ | C02F 1/72 |
| | | | | 210/748.12 |

FOREIGN PATENT DOCUMENTS

| | | |
|---|---|---|
| DE | 3247320 A1 | 7/1984 |
| DE | 19716989 A1 | 11/1988 |
| DE | 19618888 A1 | 6/1997 |
| JP | 61008189 A | 1/1986 |

* cited by examiner

*Primary Examiner* — Lucas A Stelling
(74) *Attorney, Agent, or Firm* — Yakov Sidorin; Quarles & Brady LLP

(57) ABSTRACT

A system separation device with at least one pressure-proof tank for containing a liquid that forms a predetermined liquid level in the tank, above which level there is a gas cushion. The device contains an inlet in the upper region of the tank for fluidly feeding the tank from a first fluid system, and an outlet in the lower region of the tank for forwarding the liquid to a second fluid system. To prevent the germ-infestation of the inlet, at least one germicide material is arranged in the region of a gas cushion above the liquid level.

14 Claims, 3 Drawing Sheets

SYSTEM SEPARATION DEVICE

CROSS-REFERENCE TO RELATED APPLICATIONS

This application is a continuation-in-part of pending International Application No. PCT/EP2016/068516 filed on Aug. 3, 2016, which designates the United States and claims priority from German Application No. 10 2015 112 791.1 filed on Aug. 4, 2015. The disclosure of each of the above-identified applications is incorporated herein by reference

BACKGROUND OF THE INVENTION

1. Field of the Invention

The invention relates to a device configured to separate two water ducting systems, which is referred to as a system separation device. The system separation device comprises at least a tank for a liquid, e.g. water, which liquid fills the tank in operation to form a predetermined liquid level in the tank. Above this level, a gas cushion is located in the tank. The tank has an inlet in the upper region of the tank. The inlet is configured to feed the tank from a first fluid system (for instance, by adding fresh water). The tank has an outlet, interchangeably referred to as an extraction point, in the lower region of the tank. The outlet is configured to forward the liquid from the tank to a second fluid system. The tank is pressure-proof, such that the gas cushion above the liquid level is under the pressure produced by (associated with) the inlet, i.e. the pressure being applied by the inlet to the tank pressurizes the gas bubble(s) and the outlet.

2. Description of Related Art

Modern drinking water supply systems have one or more central water treatment installation(s), from which, inter alia, microbiologically noncritical drinking water is fed into a supply network. However, there exists the risk that germs could be introduced into the drinking water network via the outlet(s) of the drinking water network, especially when outlets are installed in germ-prone areas such watering places, slaughterhouses, hospitals, refill inlets of process water cisterns. Due to variations of pressure of water supply, there is a danger of 'sucking in' the germ-contaminated water. In addition, there is the risk of germ migration on/along the inner walls of the supply pipes.

All that causes the concerns that germs may migrate against the direction of flow of water. The "back migrated" germs would, as soon as they reach a branch of the public drinking water network, be distributed with the flow to all consumers downstream of the branch. In order to prevent this contamination, so-called system separation devices are required in establishments from which a corresponding risk of back migration arises (cf. DIN1988/EN1717). Such system separation devices shall preclude the entry of germs from a downstream water system into an upstream water system.

A system separation device has a reservoir or tank with an extraction point located in the bottom region. Such extraction point is also referred to as an "outlet". Water extracted from the reservoir is replaced through an inlet with fresh water. The inlet is located above the water level in the tank and (in the sense of not being in contact with the water in the tank) is referred to as 'free inlet'. Thus, germs cannot migrate from the reservoir or tank into the inlet. If the reservoir is open (that is, it is in fluid communication with the ambient air), there is the disadvantage that an additional pump had to be arranged between the extraction point of the reservoir and the final extraction point, i.e. a faucet or the like. In addition, there exists the risk of contamination of the inlet via air exchange (e.g. by insects, dust, etc.). Alternatively, it has been proposed to design the reservoir as a pressure vessel, i.e. with the free outlet opening into a pressure vessel. In this scenario, the pressure vessel is pressurized via the inlet, such that it is possible to dispense the liquid with the additional pump. Here, the risk of contamination of the inlet by air exchange is greatly reduced. Such systems are described e.g. in DE 1708613, DE 10 2014 113 671 and DE 20 2007 004 345U1.

SUMMARY

In the known systems separation devices, a plurality of technical problems arises. On the one hand, there are problems concerning reliability of operation. On the other hand, a naturally very high humidity is maintained in the pressure vessels of the devices of the prior art, which humidity facilitates the spreading of the germs the wall(s) of the pressure vessel and also via the air cushion in the head region, and such spreading cannot be completely excluded. In addition, it is observed that the volume of the air cushion that separates the water level in the pressure vessel and the free inlet, of the prior art, decreases during operation such that the system separation is only established if air is regularly refilled/added into the pressure vessel. To this end, expensive air refilling devices have to be used to complements the system separation devices of prior art.

Embodiments of the invention provide a system separation device with improved reliability as compared to that of the devices of prior art.

In an embodiment, the system separation device is configured to separate two fluid systems—for example, a drinking water network (i.e. system 1) from a downstream, usually local supply system (system 2)—for the use in a hospital, a homestead, a slaughterhouse, a fire water storage etc. The implementation of systems separation has to be provided for the connection of establishments of hazard class 5 (see DIN EN 1717) in accordance with DIN EN 1717.

A system separation device according to an embodiment of the invention has at least one tank for receiving a liquid (e.g. for storing water). The tank is also referred to as a reservoir. The tank has a liquid inlet in its upper region ('an inlet', for short), e.g. an inlet for drinking water. In its lower region, the tank has a liquid outlet ('an outlet', for short) configured to forward the liquid to a consumer (i.e. via an extraction point). In operation, there is a liquid in the tank (while such liquid in practice is usually water, in the following "water" is use only as an example of multiple liquids that can be contained in the tank), filling the tank up to a level referred to as a liquid level. Above the liquid level there is a volume of gas or gas cushion in the head area of the tank. The gas cushion separates the inlet from the liquid in the tank. The inlet is thus arranged above the liquid level in the tank. Accordingly, germs from the liquid in the bottom area of the tank cannot easily reach the inlet. The outlet is arranged below the liquid level.

The gas cushion is pressurized by, and a result of, the liquid flowing into the tank via the inlet until the pressure formed in the tank is equal to the pressure present in the duct feeding the inlet. Accordingly, the pressure in the tank is predetermined by the liquid feed (if no pressure reducer or the like is additionally provided). In the simplest case, the gas includes air and a gas cushion is an air cushion. Due to the pressure in the tank, no pump is needed to forward the liquid from the tank to the consumer. Thus, the energy consumption of the system separation device is reduced, which is particularly advantageous in the case of using the embodiment for large cattle sheds, for example (for which usually pumps with high power are necessary). In addition, such embodiment of the system separation device may easily be used for hot water applications, e.g. in slaughterhouses, dairies or hospitals, because no pumps suitable for hot water are necessary. Furthermore, this system separation device is also suitable for other fluids/liquids than water, e.g. milk, beer, wine, juice, etc.

Preferably, the tank level, i.e. the height of the liquid level in the tank (or, stated differently, a level of liquid filling the tank during the operation) is detected via at least one level sensor, with which the device is equipped. For example, the level sensor may detect a predetermined maximal tank level. Thereby, it can be ensured that decrease in a volume of the gas cushion will be detected. Should such decrease occur, the volume of the gas cushion is then increased preferably automatically by operating means or a device for an optional gas supply. The signal output(s) from the level sensor can be provided/directed to a controller (or controller circuitry). Upon the liquid's reaching and/or exceeding the maximum tank level, the controller is operated to activate the gas supply device and/or a display which, in operation, produces an output signal when the fill level is reached.

In one embodiment, the tank has a release opening that is controlled by a release valve. The controller (or controller circuitry) may be configured to open the release valve in case when a predefined minimum distance between the inlet and the level of liquid cannot be operationally maintained. To provide an illustration to this situation, the level sensor is configured to determine the predetermined maximal level of liquid in the tank. As a result of opening the release valve, the liquid flows via the release opening (for instance, into a cistern or a sewage system). In this situation, fresh germ-free liquid keeps flowing through the inlet and arriving into the tank, and the risk that germs are sucked into the upstream liquid system (e.g. a drinking water supply system) is reduced to a minimum, as the germs would have to propagate against the liquid flow. In addition, the process of releasing the liquid enables/facilitates the augmentation of the volume of (and not only the pressure caused by) the gas cushion by inserting pressurized gas in the tank as set out above.

The space occupied by the gas cushion in the head region of the tank separates the inlet from the outlet. Preferably, at least one germicide is arranged in this space/region to reliably prevent germs from migrating in the humid milieu of the head space on the inner wall of the tank in the direction towards the inlet.

In one case, the germicide may comprise at least one UV light source. The UV light source is preferably configured to irradiate the tank wall (i.e. the inner side and/or portion of the tank wall) and preferably also the inlet with ultraviolet (UV) light. Preferably, the UV light source is oriented in such a way as to irradiate at least or exclusively an annular strip of the tank wall located above the level of liquid filling the tank. It is particularly preferred if the irradiated strip surrounds the inlet annularly, in a shape of a ring. As a result, germs reaching the annular strip are reliably killed. In addition, it may suffice to irradiate a relatively small region with UV light to prevent germs from intruding into the fluid network supplying the inlet (i.e. system 1). Thus, the necessary radiant power is reduced as compared with the radiant power levels required by system(s) of related art. Additionally or alternatively, the inlet itself may be irradiated with UV light.

By irradiating the liquid and the region below the liquid level, the tank and the fluid reservoir can be kept at least largely free of germs.

The term UV light ("ultraviolet light"), usually (and so also herein) refers to electromagnetic radiation with a wavelength A, which is below the typical wavelength of the human perception but above the wavelength(s) of X-rays. Typically, the term "ultraviolet radiation" or "ultraviolet light" is used for wavelengths less than about 400 nm and greater than 1 nm. Particularly preferred, also UV-C light with a wavelength between 200 nm and 300 nm can be used. Corresponding light sources are readily available and have a high reliability. A regular intermittent irradiation of the tank inner wall, preferably also below the liquid level, has proven to be sufficient for reliably killing germs than potentially entered the tank via its outlet, i.e. its extraction point. Accordingly, at least one UV light source, which at least partially dips into the liquid, may be arranged in the tank.

Additionally or alternatively, the gas cushion may have an included germicidal component (at a concentration that is higher than a concentration of such germicidal component in natural air), i.e. a preferably gaseous germicidal substance, e.g. a halide such as chlorine or bromine. Such germicidal gases go into aqueous solution and are therefore also dissolved in the liquid drawn from the tank. Accordingly, when observing a reduction of the volume of the gas cushion, the controller circuit opens a refill valve thereby providing a liquid communication of the tank and a pressurized source of germicidal gas.

Germicidal gases such as chlorine or bromine do not present problems when present within the permitted limits in drinking water (and are in fact sometimes explicitly allowed for drinking water disinfection). In addition, the presence of such gases also achieves sterilization or at least a germ reduction of the outlet side pipes. The risk of germ migration into the tank is therefore reduced.

Preferably, a coating of a germ-inhibiting (or preferably germicidal), i.e. antimicrobial material is applied to the inner side of the tank wall in the region corresponding to the gas cushion and/or in or around the region of the inlet. In other words, the inner side of the tank may comprise a coating of a germ-inhibiting or preferably germicidal material. For example, at least one ring with an antimicrobial surface (e.g. a ring of copper and/or silver) can be attached onto the tank inner wall or on or in the inlet. The antimicrobial ring effectively divides the tank into an inlet side or portion (usually, an upper part) and a outlet side or portion (usually, a lower part). On the way from the outlet to the inlet, germs would therefore have to migrate over the antimicrobial material that is annularly arranged with respect to the inlet (such as to surround the inlet), which is not possible (that is, the germs would be eradicated) due to the material's antimicrobial property. Particularly preferred, the ring has a photocatalytic self-cleaning surface.

As the upper region or upper part of the tank, generally a top wall of the tank is understood, it forms a second or upper end face of the tank, and/or a region of a side wall of the tank, which preferably extends from the top wall until a half, (more preferably until one third, and even more preferably until one fifth) of the distance separating the top wall and the bottom wall of the tank. The upper region (and thus the upper part) is the region which is above the nominal value of the liquid level during normal operation of the tank. The lower region (i.e. the lower part) correspondingly designates the region that adjoins the upper region downwards, i.e. the region below the nominal value of the liquid level (during normal operation). For example, the antimicrobial ring may have a surface made of or at least comprising a semiconductor or other judiciously chosen material, e.g. a hard oxide such as titanium dioxide ($TiO_2$), more preferably $TiO_2$ nanoparticles. Such material may for example be applied as a coating on the inner surface of the tank. Such semiconductors form electron-hole pairs upon irradiation with short wavelength light (i.e. the energy of the photons must be greater than or equal to the band gap). The electron-hole pairs act like radicals on organic substances. Such semiconductors therefore have the property of decomposing organic substances, if they are irradiated with sufficiently short-wave light, e.g. UV light. Compared to sterilization with the use of an UV light source only, the radiant power, and thus the energy consumption of the so-configured device can be significantly reduced. In particular the use of $TiO_2$ as an antimicrobial material is advantageous, because it is largely inert and insoluble in water. $TiO_2$ is considered as non-toxic, and there is no health risk when small amounts are introduced into the water drawn from the outlet.

In addition, the disinfectant may be an antimicrobial liquid floating on the (primary) liquid level of the tank ("sterilization liquid", for short). Such anti-microbial liquid is chosen, therefore, to be a non-water-soluble (secondary) liquid with density that is lower than the density of water (wherein "water is used but as an example for the primary liquid being stored in the tank). This antimicrobial liquid acts as a seal preventing the germs from migrating from the water towards the inlet. Due to the wetting of the tank wall, there is no possibility for a germ migration via the inner tank surface. The following water flow can easily pass through the sterilization fluid. With help of calming means, mixing of the sterilization liquid with the water in the tank can be reduced to an acceptable minimum.

Additionally, preventing germs from entering the tank can be achieved by reducing the refilling of the gas cushion to a minimum (this is prompted by the realization that during refilling, e.g. of air, germs might be introduced into the tank). These introduced germs then infest the supply network via the inlet. Reducing the refilling is possible, however, if the gas is produced in the pressure vessel (i.e. the tank) or even does not leave the vessel. Gas production is possible by means of electrolysis without having to open the container. However, the gas mixture formed during the electrolysis of water is highly explosive (and is referred to as oxyhydrogen gas). The discharge of large quantities of such gas with the water via the outlet (in case when needed by the agricultural applications, for example) might become a problem. An explosion in the tank is also conceivable, since even a very small spark may suffice to ignite a small amount of such gas.

Preferably, the tank has a device component or subsystem configured to absorb kinetic energy of the liquid flowing from the inlet into the tank over a free distance. For example, a float or floating body may be arranged on the liquid level in the tank, onto which liquid entering from the inlet impinges. From the surface of the float, the liquid continues to flow comparatively slowly into the liquid reservoir. It was empirically determined that with slowly flowing water, only very few gas bubbles are formed in the liquid reservoir. Accordingly, less gas is withdrawn through the outlet. Also, the amount of gas dissolved in the liquid per time unit is reduced.

Preferably, at least one calming means, e.g. a calming plate, is arranged between the liquid level and the outlet. The calming means is configured to reduce the mixing of the upper layers with the lower layers (i.e. layers near to the outlet) of the liquid in the reservoir. As a result, gas bubbles which are formed when the inflowing liquid jet immerses, do not propagate so deep into the liquid reservoir. The risk that these bubbles will leave the tank via the outlet, is correspondingly reduced. In addition, the residence time of the gas bubbles in the liquid is shortened, i.e. there is less gas in a solution. The system separation is particularly safe if it has a first valve that closes or opens the inlet, and has a second valve that closes or opens the outlet. Preferably, the first and second valves are connected with one another, such that they e.g. synchronously open and/or close their corresponding targets. For example, the valves may each have a valve body for closing a valve seat, wherein the two valve bodies (that is, the valve bodies of the first and second valves) are connected with the float body (normally positioned above the intended liquid level and below the maximum allowed liquid level) via a common actuating means (such as a rod, in one implementation). In other words, the inlet and the outlet preferably each have a valve seat for each valve body, respectively, The valve body closes the valve seat when a float rises above a predetermined height or level of liquid filling the tank in operation, thereby preventing the potential infection of the inlet/outlet with bacteria (if present) in the rising liquid The two valve bodies may be coupled via an actuating means, e.g. a rod. The float or floating body may be attached to the actuating means.

Another example of a calming means is a receiving pot. For example, the tank may include a receiving pot element or components disposed at least partially in the reservoir and below the inlet. To avoid ambiguities, the receiving pot preferably comprises a bottom wall and a side wall defining a rim. The rim faces at least essentially upwards and circumscribes the receiving pots opening. So configured, the receiving pot is positioned and oriented relative to the inlet in such a fashion as to receive liquid flowing from the inlet via the gas cushion into the receiving pot. In operation of the device, the receiving pot very efficiently prevents bubbles (that are generated by the liquid flowing into the reservoir) from entering the extraction point. The bottom of the receiving pot absorbs the kinetic energy of the liquid falling down or directed downwards from the free inlet into the reservoir, and prevents a 'direct flow' of the liquid towards the extraction point. Rather, the liquid is redirected to flow upwards over the rim of the receiving pot prior to reaching the extraction point and the gas bubbles rise to the liquid level to enter the gas cushion.

The rim is formed preferably in the vicinity of the intended liquid level that liquid, filling the tank in operation, would reach. The rim may be formed slightly above or slightly below the liquid level of the reservoir. The terms slightly above and/or below have to be interpreted with respect to the depth of the reservoir at normal operation, i.e. ±20%, preferably ±10% or less of the depth. The depth is defined to be the vertical distance between the fluid level and the outlet that is connected to the extraction point. As the liquid has to flow over the rim, the liquid's flow velocity is reduced and in addition the stream is directed towards the gas cushion, thereby enabling gas bubbles to rise upwards and leave (escape from) the liquid, i.e. to reenter the gas cushion. The diameter of the receiving pot is preferably larger than that of the inlet, e.g. twice as big or bigger. The larger the diameter, the slower is flow velocity of the liquid when passing over the rim and the fewer bubbles are delivered with the liquid flow via the extraction point from the tank. The volume of the gas cushion thus essentially remains constant (assuming a constant pressure in the tank).

To provide additional clarification, preferably, at least one first valve (e.g. a check valve preventing a backflow from the downstream system into via the inlet into the upstream system) is provided between the supply pipe feeding the inlet and the inlet, and/or at least one check valve (preventing the liquid from flowing back as well) is provided between the outlet and the drain pipe adjoining to the outlet.

Preferably, the second valve opens as a result of and/or in response to a predetermined pressure difference between the reservoir and the part of the system separation downstream of the second valve. The first valve is then preferably opened by the second valve and closes when the gas cushion has reached a nominal pressure. it is particularly preferred that both the first and the second valve are embodied as check valves and/or are, respectively, connected in series to a check valve. That is, between the supply pipe to the inlet and the inlet is at least one check valve, and/or at least one check valve is arranged between the outlet and the drain pipe is at least one check valve.

Preferably, the tank has a ventilation device, which may be positioned between the liquid inlet and the liquid outlet. The ventilation device is configured to prevent the situation when the tank level falls below a predetermined minimum ($B_{min}$). The ventilation device has at least one ventilation valve, advantageously two redundantly designed ventilation valves (in particular, automatic ventilation valves with floats) or the like. The ventilation valves may for example be connected in parallel, so that in case of failure of one of the valves, another valve is always ready to operate for the failed one. If the liquid level falls below a minimum nominal value, the at least one ventilation valve can be opened, while the inlet is opened and the outlet is preferably closed. A portion of the gas cushion can be released. As a consequence, liquid from the inlet pours into the tank and thus the level in the tank rises. Upon reaching a refill nominal level, the at least one ventilation valve is closed, either by design (if it is e.g. controlled by a float or floating body) or by a controller in response to signal(s) from a liquid level sensor. During the ventilation, the pressure in the tank remains at least approximately constant because liquid flows in via the inlet. This configuration avoids excessive continued flow via the inlet after reaching the refill nominal level. In other words, such configuration facilitates maintaining the difference between the refill nominal level and the nominal level, in normal operation, to be comparatively low, and therefore the construction height of the tank can be reduced as compared to those of related art.

For example, the system separation device may be configured to maintain the gas cushion at a certain level with the use of a gas generating device. For example, the gas generating device may have a gas inlet valve that is shut off in normal operation. In an open state, however, the gas inlet valve connects the interior of the tank with a gas reservoir, preferably with interposition of at least one filter. In addition, the gas generating device (interchangeably referred to as gas cushion generation device), has a drain opening (a 'drain', for short) for discharging liquid from the tank. The drain can be opened and closed again via a drain valve. In addition, the gas generating device may comprise a corresponding controller or controller circuitry, which is adapted to close an inlet control valve and also to close an outlet stop valve. Then the drain valve and the gas inlet valve are opened (preferably, with the drain valve being opened first and the gas inlet valve being opened with a slight delay). Consequently, liquid flows out of the tank, and the volume of the outflowing liquid is replaced by gas from the gas reservoir, for which replacement the inlet opening of the gas inlet valve should be above the fluid level. After a predetermined amount of the outflowing liquid has been replaced (which e.g. can be determined via a liquid level sensor), the drain valve and the gas inlet valve are closed. If now the inlet control valve is opened, the incoming into the tank liquid compresses the gas cushion. Once the nominal pressure has been reached, the system separation device can switch back to normal operation, in which the inlet and outlet are opened or closed as otherwise required. The advantage of this proposed methodology is that an expensive and maintenance-prone compressor (or compressed-air cylinders) for refilling compressed air (or other pressurized gas) can be dispensed with and not utilized. The potential disadvantage is that the tank is not available for use as a liquid reservoir for a short period of time. If a brief interruption of the liquid supply (e.g. during night hours) cannot be tolerated, a second tank arranged operably parallel to the first one may be provided, which configuration would maintain the liquid supply during operation of the gas generating device.

Alternatively or additionally, the gas generating device may include a pressure generating device, e.g. a compressor. It is preferably connected to the tank via gas supply device opening into the tank interior. Particularly preferred is the configuration in which the compressor feeds a storage tank, which can now serve as compressed air storage. Pressure variations of the gas cushion/hygiene zone can thus be compensated by supplying gas from the storage tank into the tank of the device, and without having to supply further gas by the compressor into the storage tank. In this way, the number of switching "on" and "off" operations of the compressor is reduced, which increases the life time of the compressor and at the same time further reduces the energy consumption of the system separation device according to the invention. Of course, the gas compressed with a compressor can also be stored in pressure cylinders. The gas can include air, wherein with the suction of air preferably a filter is used to catch/precipitate dust and germs. In addition, a sterilizing gas may be added to the air (as discussed above).

Alternatively or in addition to the use of the pressure generating device, the gas cushion can also be maintained by means of targeted out-gassing of water/liquid, without the supply of external gases, e.g. by one or more of the following options:
  stirring or agitating with stirrer,
  targeted introduction of solids that generate gas with water,
  out-gassing of the water by electrolysis by splitting into hydrogen and oxygen (physical decomposition of the water).

To stir/agitate the fluid in the tank, a stirring device coupled with the tank interior may advantageously be provided to operate as a gas generation device. As a result of stirring, gas dissolved in the liquid is released again, thereby increasing the pressure in the gas or air cushion.

Alternatively or in addition to the targeted introduction of gas-generating solids or liquids, a supply device may be provided as a gas generating device. The supply device is suitable for supplying gas generating solids or liquids into the tank interior. It can, for example, be formed by a supply pipe opening into the tank interior. The supply device is preferably formed as a pressure lock, e.g. as a rotary valve.

The tank may for example have a rectangular or annular cross-section. The side wall of the tank may be dimensioned to define a constant cross-section of the tank between the bottom wall and the top wall. Alternatively, the side wall of the tank may be dimensioned to define an at least partially tapered cross-section of the tank between the bottom wall and the top wall. For example, the upper part of the tank may be formed/shaped as conical inlet. This configuration has the advantage that the liquid surface is reduced in the upper region of the tank, whereby the liquid can absorb less gas. Thereby, the gas consumption of the pressure generation device is reduced on the one hand, and on the other hand oxygen deprivation is prevented on the other hand. Particularly preferred is the situation when the cross-sectional area of the tank tapers off above the liquid level (that is, above a nominal liquid level in normal operation of the embodiment).

Furthermore, the gas supply device may have a regulated control valve, in particular a solenoid valve or pneumatic valve, configured for controlling the gas supply into the tank interior. In this way, a simple control of the gas supply can take place without changing the operation of the compressor, if such compressor is provided.

Preferably, the system separation device has several, preferably two, level sensors. These sensors can be designed and structured as touch probes, floats, ultrasonic sensors, or the like. By providing a plurality of level sensors, the failure of one level probe cannot cause the liquid level in the tank to rise uncontrollably. Additional safety can be introduced by the probes using different measuring principles, e.g. one probe as a float, another probe as touch probe.

To further increase safety of operation of the embodiment, a check valve may be connected to the liquid outlet in such a way that it allows only one liquid flow direction out of the tank interior. In this way the flow-back of the contaminated liquid from the consumer (e.g. a cattle watering) into the tank is prevented.

Preferably, a check valve can be provided at the liquid inlet, which is connected in such a way that it allows only one liquid flow direction into the tank interior. In other words, an inlet-side check valve may be used to prevent the backflow of liquid from the tank into the inlet and thus into the system 1 (such as the drinking water system, as discussed above).

Particularly advantageously, a pressure reducer may be provided at the liquid inlet of the tank, in one specific case—in the form of a throttle valve. Preferably, the pressure reducer is configured to be adjustable in operation. With the pressure reducer, the pressure in the liquid inlet (which, as described above, defines the pressure in the tank interior), is adaptable to the consumer needs. Preferably, the pressure reducer is located upstream of the check valve with respect to a flow direction into the tank interior.

Preferably, an adjustable control valve should be connected to the liquid inlet. Such valve can be realized, for example, in the form of a currentless closed (i.e. normally closed) solenoid valve or a pneumatic valve. This configuration has the advantage that in the event of a power failure, the control valve closes automatically. As a result, a possible failure of the level sensors cannot cause the liquid level to rise uncontrollably in the tank. The minimum distance between (that is, separating) the liquid level and the liquid inlet is therefore, maintained. Preferably, the control valve is located upstream of the check valve with respect to a flow direction into the tank interior. If a pressure reducer is connected to the liquid inlet, the control valve may, for example, be located between the pressure reducer and the check valve. The configuration with so located control valve has the advantage that the control valve can be designed for lower levels of pressure. For the special case of fire extinguishing pipes, the control valve as described above is preferably selected to be open in the currentless state ('normally open'), because fire extinguishing equipment must be operational in case of power failure. This selection results in an increased control and warning effort for the control of the germ-free gas cushion/hygiene zone. Should the UV sensor fail or the gas cushion/hygiene zone become too small, a warning function must be activated, e.g. a warning device may sound.

It is particularly preferred if the tank have a pressure relief valve for releasing gas or liquid from the tank when a predetermined maximum level of pressure is reached in the tank interior.

In one advantageous specific implementation, a safety tank (that is, a basin/trough/receptacle for receiving the liquid that pours out of the tank) may be positioned below the tank. Here, the term "below" is to be understood with respect to the direction of gravity. In this safety receptacle, e.g. leaking liquid due to leaks can be collected from the tank. This will effectively prevent further spread of germs, e.g. by entry into groundwater or by accidental spread by people who would come into contact with leaking liquid. Preferably, the safety receptacle has a leakage sensor for switching off the system separation device. In particular, the leakage sensor can be provided to close the liquid inlet when the liquid exits from the tank into the safety receptacle.

To power an embodiment of the system separation device, a battery circuit with at least one battery may be provided. In this way, the system separation device can be used in an "island"/"field" operation. This is particularly advantageous in hospitals or secluded locations with weak infrastructure.

The aforementioned valves and sensors are preferably connected to a controller or controller circuitry, which controls the valves as described above as a function of the variables detected by means of the sensors.

BRIEF DESCRIPTION OF THE DRAWINGS

In the following, the invention will be described by way of example, without limitation of the general inventive concept, on examples of embodiment and with reference to the drawings.

DETAILED DESCRIPTION

Figure 1:
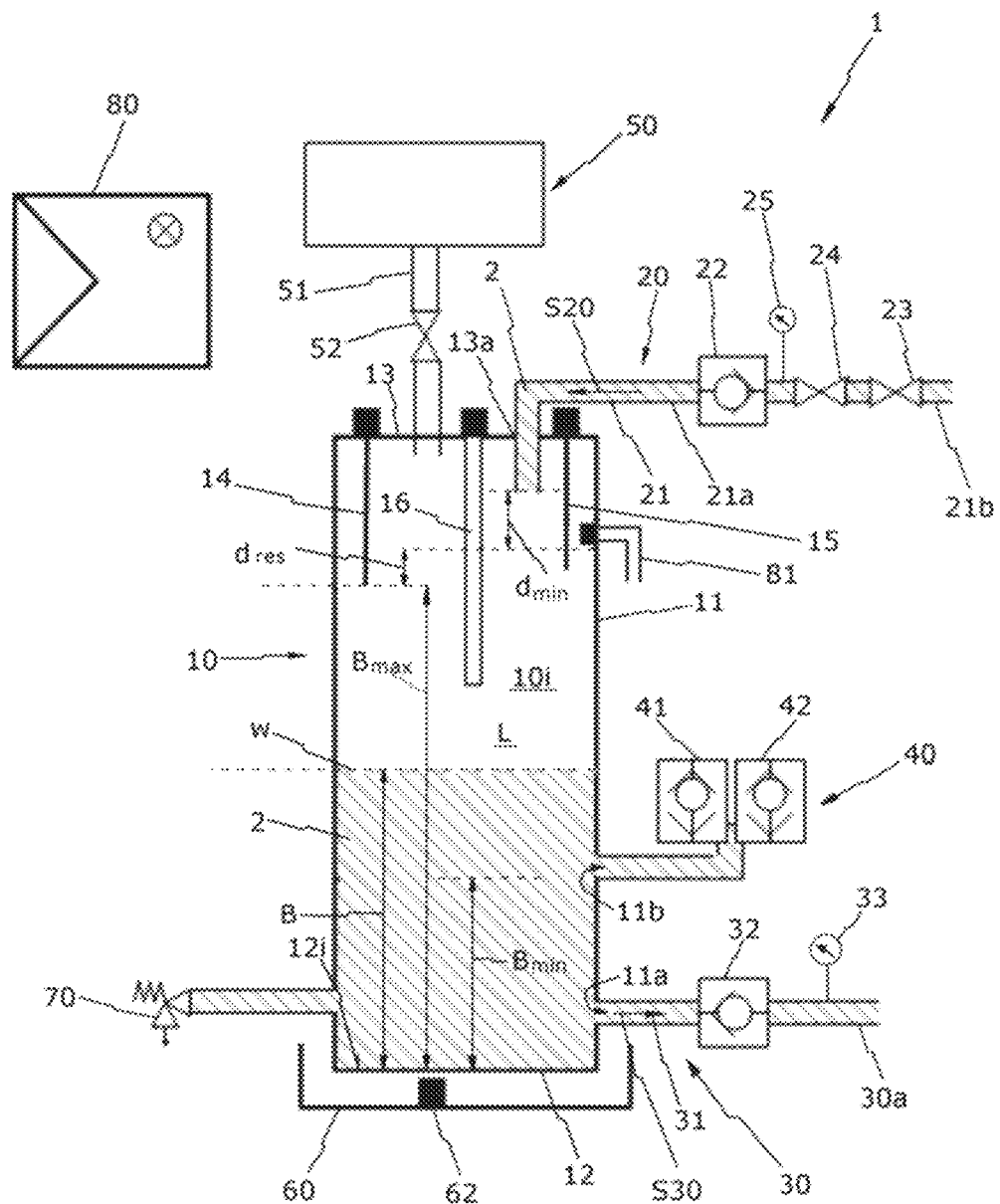
FIG. 1 shows a first system separation device.

FIG. 1 shows a system separation device 1 with a tank 10 for receiving a liquid 2 (e.g. water). The tank 10 has a side wall 11, a bottom wall 12 and a top wall 13, which together define a tank interior 10*i*. The bottom wall 12 forms a first end face of the tank 10 and defines a lower end of the tank 10 with respect to the direction of gravity G. The top wall 13 forms a second end face of the tank 10 and defines an upper end of the tank 10 with respect to the direction of gravity G.

The tank 10 is formed of a pressure-resistant material. This is preferably a hygienically acceptable material, such as e.g. stainless steel or the like.

Figure 2:
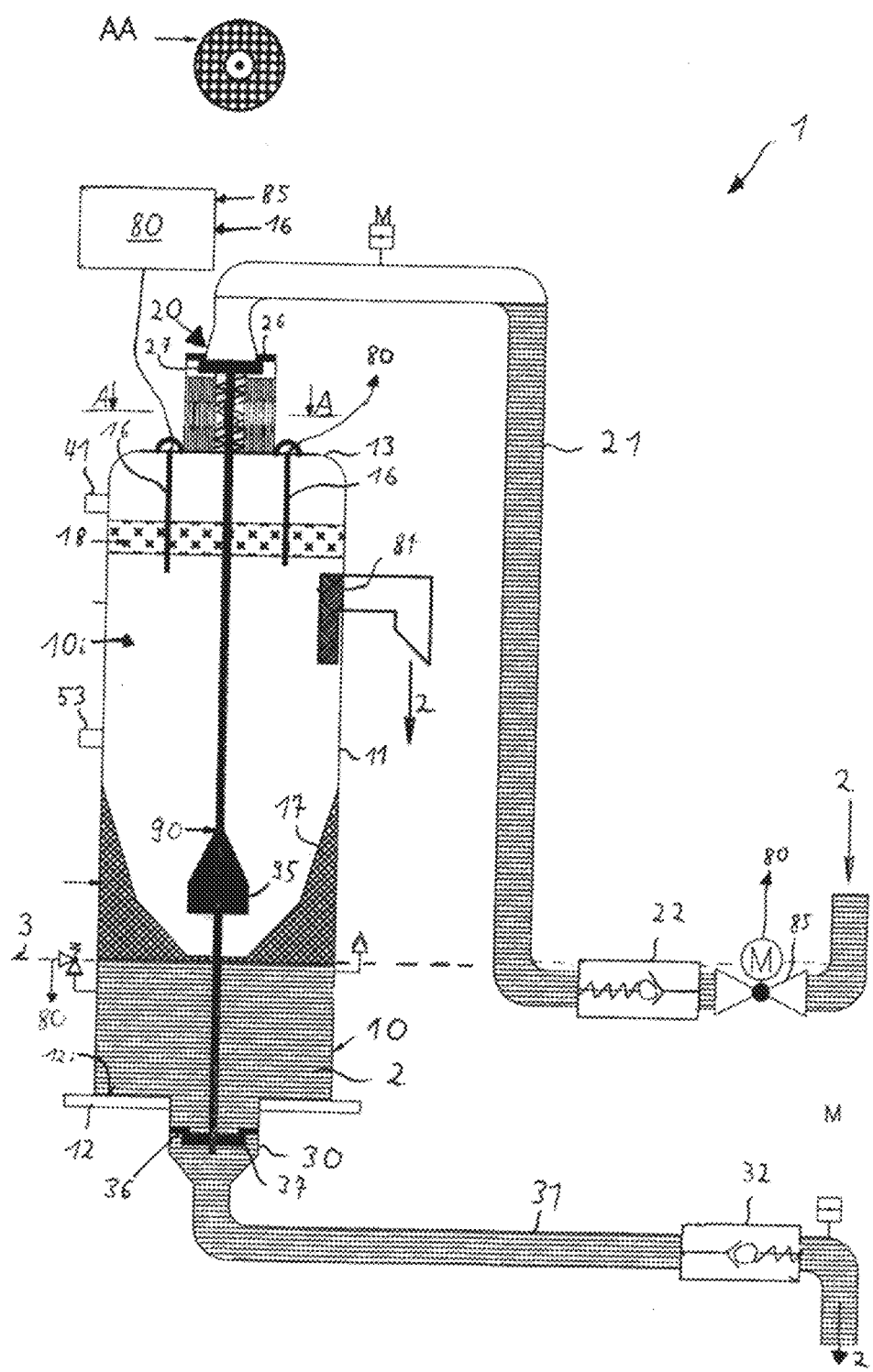
FIG. 2 shows a second system separation device.

Furthermore, the system separation device 1 has a liquid inlet 20 into the tank 10. Via the liquid inlet 20, a liquid, e.g. drinking water is fed into the tank 10. As shown in FIG. 2, the liquid inlet 20 may be formed by a (liquid) supply pipe 21 opening into the tank interior 10*i*, which is connected to the tank 10 by a recess 13*a* in the top wall 13. Also, the supply pipe 21 may be connected to the tank 10 by a recess of the side wall 11 provided in an upper region of the side wall 11. In general, the liquid inlet 20 is connected to the tank 10 in an upper region of the same.

As shown in FIG. 1, the supply pipe 21 of the liquid inlet 20 can protrude into the tank interior 10i or flush with the top wall 13 or the side wall 11.

A liquid outlet 30 is located in the lower part of the tank, i.e. below the liquid level (preferably near the bottom). The liquid 2 present in the tank 10 is delivered via the liquid outlet 30 to a drinking water or industrial water system or the like, i.e. to a consumer in general.

As shown in FIG. 1, the liquid outlet 30 may be formed by a drain pipe 31, which is connected to the tank 10 by a recess 11a of the side wall 11 provided in the lower region of the side wall 11. The supply pipe 21 can also be connected to the tank 10 by a recess in the bottom wall 12. Generally, the liquid outlet 30 is connected to the tank in a lower region of the tank 10 (e.g. in the lower half, preferably the lower third, more preferably in the lower quarter, even more preferably in the lower sixth).

Furthermore, the system separation device 1 has a ventilation device 40. It is connected to the tank 10 between the liquid inlet 20 and liquid outlet 30 and ensures that the tank level does not fall below a minimum tank level $B_{min}$.

The term "tank level" generally refers to the height of the liquid level W in the tank, i.e. the distance of the liquid surface from an inner surface 12i of the bottom wall 12 facing towards the tank interior 10i, and in particular a lowest point of the inner surface 12i of the bottom wall 12 with respect to the direction of gravity G.

The minimum tank level $B_{min}$ depends on device-specific provisions. For example, it can be provided that, depending on the liquid requirement of the consumers connected to the system separation device, a certain amount of liquid—which causes a certain tank level—must not be dropped below in the tank, such that the supply of the consumers is ensured.

As shown in FIG. 1, the venting device 40 may be connected via a connection device to the tank 10. As a connection device, e.g. a pipe may be provided which is connected to a recess 11b of the side wall 11 of the tank 10. The venting device 40 prevents falling below the minimum tank level $B_{min}$, in that a filling level sensor of the venting device 40 detects the tank level B, and an actuation valve functionally coupled to the level sensor is actuated upon reaching the minimum tank level $B_{min}$. There is a pressure $p_{zu}$ in the liquid inlet 20, which is greater than the atmospheric pressure outside the tank 10. As shown in FIG. 1, between the liquid in the tank 10 and the upper tank end there is a gas cushion as hygiene zone L which is under the pressure $p_{zu}$ of the liquid inlet 20. Thereby, an air flow out of the tank interior 10i occurs upon actuation of the actuating valve of the venting device. As a result, the pressure in the tank interior 10i decreases, which causes a subsequent flow of liquid through the liquid inlet 20.

Preferably, the venting device 40 may have an automatic venting valve with at least one float as a level sensor. Particularly advantageously, two redundant venting valves 41, 42 are controlled, i.e. opened or closed upon controlling by floats or the like. This increases the reliability of the system.

As shown in FIG. 1, the system separation device 1 has at least one level sensor 14 which detects the tank level B. It may be provided that the level sensor 14 generally detects the tank level B. Thus, the level sensor 14, for example, may also be provided as a level sensor for the venting device.

It is preferably provided that the level sensor 14 detects at least a maximum tank level $B_{max}$. The tank level $B_{max}$ is defined by a minimum permissible distance $d_{min}$ between the liquid level and the liquid inlet 20. This minimum distance $d_{min}$ must be chosen such that the passage of bacteria, germs, contaminations and the like from the medium/liquid in the tank 10 into the water inlet 20 is excluded. Preferably, $d_{min}$ is more 3-times the inner diameter of the supply pipe 21, and particularly preferred more than 6-times the inner diameter of the supply pipe 21.

As shown in FIG. 1, a maximum tank level $B_{max}$ may be provided with a reserve distance $d_{res}$ to the minimum distance $d_{min}$. As a result, the safety of the system separation device 1 is additionally increased.

To increase safety, also several level sensors can be provided. For example, as shown in FIG. 1, at least one further level sensor 15 may be arranged in the tank interior 10i. This has the advantage that, in case of failure of the level sensor 14 due to a fault, the further level sensor 15 detects the tank level B. In case of reaching the maximum tank level $B_{max}$, the further level sensor 15 shuts the liquid inlet 20 off, such that no further liquid is led into the tank 10 and the tank level B no longer rises. In this way, falling below the minimum distance $d_{min}$ it is extremely reliably prevented.

As shown in FIG. 1, the system separation device 1 may have an emergency opening valve 81. The emergency opening valve 81 is preferably designed as a float valve, which has a level indicator in the form of a float and an actuation valve being functionally coupled to the level sensor. The level indicator of the emergency opening valve 81 detects the tank level B. Upon reaching a tank level B at which the minimum distance $d_{min}$ between the liquid level W and the inlet 20 is reached, the actuation valve of the emergency opening valve 81 is actuated and allows liquid to flow out of the tank interior 10i. As a result, the emergency opening valve 81 forms an (emergency) outlet of the tank 10 into the atmosphere.

Should for any reason the regulation of the level sensors 14, 15 be defective, the emergency opening valve 81 ensures that the liquid level W cannot rise so far that the minimum distance $d_{min}$ is not maintained. Thus, the hygiene region is triple-protected. Even in case of power failure, the minimum distance $d_{min}$ is guaranteed. The overflow of the emergency opening valve 81 may end in an optional safety basin 60.

The level sensors 14, 15 can be designed as touch probes, floats, ultra-sonic probes or the like.

As already described, there is a gas cushion as the hygiene zone L between the medium/liquid in the tank 10 and the upper tank end, which gas cushion is under the pressure $p_{zu}$ of the liquid inlet 20 being established in the tank interior 10i. The gas cushion and thus also the hygiene zone L extend in particular between the liquid surface and the top wall 13 of the tank 10. In order to keep the pressure of the gas cushion/hygiene zone L constant, the system separation installation 1 has a gas generating device. As shown in FIG. 1, it can be designed as a pressure generating device 50. Alternatively or additionally, one or more of the alternatives described above may be provided as the gas generating device (each of them not shown):

The pressure generating device 50 has a gas supply device 51 opening into the tank interior 10i. The pressure generating device 50 ensures that the gas cushion is always under a constant pressure, i.e. any gas losses are compensated by the pressure generating device 50. This prevents the depletion of the gas cushion, which would cause the liquid level W to rise. In this way, it is excluded that the minimum distance $d_{min}$ between the liquid level and the liquid inlet 20 is not maintained. A migration of germs from the medium/liquid which is located in the tank 10, to the medium/liquid, which is located in the liquid inlet 20 is prevented with extremely high reliability by means of the system separation installation of FIG. 1 according to the invention.

Due to the pressure $p_{zu}$ of the liquid inlet 20 lying above the atmospheric pressure, the system separation device 1 of the invention can do without additional pumps, since the liquid is not depressurized and the inlet does not communicate with the atmosphere. Thus, the system separation device (FIG. 1) is also readily suitable for hot water applications, such as in dairies, slaughterhouses or hospitals, since no expensive hot water pumps are needed. No electrical energy needs to be provided for the operation of the pumps. The inventive system separation device 1 is thus very energy efficient.

In order to keep the pressure in the hygiene zone L at least substantially constant, it can be provided that the pressure generating device 50 feeds a gas, e.g. air, via a gas supply device 51 to the tank interior 10i.

As shown in FIG. 1, a controllable control valve 52, e.g. in form of a solenoid valve or a pneumatic valve, can be provided in the gas supply device 51 which regulates the amount of gas to be fed to the tank 10.

A compressor or other gas generating method may be provided as the pressure generating device 50. This can be directly connected to the tank 10 via the gas supply device 51. Advantageously, the compressor may also feed a storage tank (not shown) which is connected to the tank 10 via the gas supply device 51. This has the advantage that pressure variations of the air cushion L within a certain range, in particular small pressure variations, can be compensated by supplying gas from the storage tank into the tank 10, without further gas supply by the compressor into the storage tank being necessary.

As further shown in FIG. 1, at least one UV light source 16 may be provided in the tank 10. It emits ultraviolet (UV) radiation, which leads to killing of germs possibly present in the tank interior 10i. Preferably there are at least two UV-sources and a controller (electronic) circuitry configured to monitor the operation of the UV-source(s). If a first UV-source fails, the second one is switched on and an alarm signal may be provided e.g. to a corresponding building Control Center.

In order to ensure the sterility of the tank interior 10i, the liquid outlet 30 can furthermore have a check valve 32, as shown in FIG. 2. This is connected to the outlet 30 in such a way that it allows only one flow direction S30 of the liquid 2 out of the tank interior 10i. When flow occurs in a section 30a of the outlet 30, which is located downstream of the check valve 32 when viewed from the tank 10, and which has a flow direction opposite to the flow direction S30, the check valve 32 locks the outlet 30. As a consequence, no water can flow back from the section 30a into the tank interior 10i. Thereby, germs introduced by the consumer are prevented from entering into the water in the tank 10. (Water is but one example of "liquid").

FIG. 1 further shows that a manometer 33 for detecting the pressure in the outlet 30 can be arranged in the outlet 30.

The inlet 20 may have a check valve 22 which is connected to the inlet in such a way that the check valve 22 permits only one flow direction S20 of the water into the tank interior 10i. This prevents that water can flow back from a section 21a of the water supply pipe 21, which section 21a is located upstream of the check valve 22 when seen from the tank 10) into a section 20b of the water supply pipe 21 being located downstream of the check valve 22 when seen from the tank 10. In this way it is ensured that even when the maximum tank level $B_{max}$ is exceeded, no water from the tank interior 10i, which may be contaminated with germs, can reach the section 20b of the water inlet 20 connected to a fresh water supply.

The system separation device 1 may further comprise a pressure reducer 23 being connected to the water inlet 20. The pressure reducer 23 may be designed as a controllable throttle valve and is preferably located upstream of the check valve 22 with respect to the flow direction S20 being directed into the tank interior 10i. By means of the pressure reducer 23, the pressure $p_{zu}$ of the water inlet can be adjusted to the desired level.

Furthermore, as shown in FIG. 2, a regulated control valve 24, in particular in the form of a currentless closed magnetic valve or pneumatic valve, can be provided at the water inlet 20. In the case of a fire extinguishing device, a normally open valve must be used. The regulated control valve 24 is located preferably upstream of the check valve 22 with respect to the flow direction S20. If a pressure reducer 23 is provided at the water inlet 20, the regulated control valve 24 may preferably be arranged between the pressure reducer 23 and the check valve 22, as shown in FIG. 1.

Similar to the water outlet 30, a manometer 25 for reading the pressure in the water inlet 20 can be arranged in the water inlet 20.

In addition, the tank 10 may have a pressure relief valve 70 (safety valve $p_{max}$) for discharging gas or medium/liquid 2 from the tank 10. In the embodiment of the system separation device 1 shown in FIG. 2, the pressure relief valve 70 is connected to the tank 10 in the lower tank region. The pressure relief valve 70 can of course also be connected to the tank 10 in the upper tank region. When a maximum pressure is reached in the tank interior 10i, the pressure relief valve 70 opens and allows a flow of gas or liquid out of the tank interior, such that the pressure in the tank interior 10i decreases. Advantageously, a collecting tank is located at an outlet of the pressure relief valve 70, in which water is collected, that optionally escapes from the tank 10 when opening the pressure relief valve 70.

As further shown in FIG. 1, a safety trough 60 may be arranged below the tank 10 that is with respect to the direction of gravity G under the tank. If the tank leaks, the safety trough 60 collects the escaping medium/liquid 2. This prevents that medium/liquid possibly contaminated with germs enters from the tank interior 10i into the environment. This is particularly advantageous in hospitals, as especially there an uncontrolled spread of germs must be prevented under all circumstances.

Preferably, the safety trough 60 may have a leakage sensor 61 which detects when medium/liquid accumulates in the safety trough 60. As a consequence, e.g. when reaching a maximum allowable amount of liquid in the safety trough, the system separation device 1 turns off. In particular, it can be provided that when switching off the system separation device 1, the water inlet 20 into the tank 10 is closed, e.g. by shutting-off the regulated control valve 24.

The system separation device 1 is functionally connected to a control device or circuitry 80 (shortly 'controller 80') for controlling and regulating the operation of the system separation device.

FIG. 2 shows a closed tank 10 of a system separation device. The tank 10 has an overhead inlet 20, which is connected with a first fluid system, e.g. a drinking water network (indicated by arrow 2, which symbolizes liquid supply), via a liquid supply pipe 21 (shortly 'supply pipe' 21). In the supply pipe 21, there is an electrically controllable switching valve 85 and a check valve 22 to separate the inlet 20 from the first fluid system. The switching valve is connected to a controller 80. In addition, the tank 10 has an outlet 30 (liquid outlet 30) located at the bottom, which feeds a second water system via a drain pipe 31. Preferably, a check valve 32 and a preferably electrically controllable switching valve can be arranged in the drain pipe 31, similar to the supply pipe 21.

The inlet 20 and the outlet 30 each have a valve seat 26, 36, which can be closed by a respective valve body 27, 37, such that the inlet 20 and outlet 30 are shut-off. Accordingly, the valve bodies have an open position in which they release the valve seats 26, 36, and a closed position in which the valve seats 26, 36 are closed. The two valve bodies 27, 37 are connected to one another by an actuating means 90 (here: rod 90), such that always both valve bodies 27, 37 are adjusted synchronously between their corresponding open position(s) and closed position(s). A float (floating body) is attached at the actuating means 90, which presses both valve bodies 27, 37 against their valve seats 26, 36 by means of the actuating means 90 with increasing fluid level in the tank, such that inlet 20 and outlet 30 are closed. This can be reliably prevent that the fluid level increases over a predetermined height in the tank 10, e.g. by fluid flowing back over the outlet. Liquid being eventually contaminated with germs can therefore not reach the inlet. Preferably, at least one of the two valve bodies 27, 37 is biased against the corresponding valve seat (for example, in a direction of the corresponding closed position). The valve in the inlet 20 and/or the valve in the outlet 30 only opens at a corresponding pressure difference. Even low inflow of potentially germ-infested or otherwise contaminated liquid into the tank 10 is excluded, as well as an inflow of potentially contaminated gas or liquid into the inlet 20. Merely in the event that nevertheless the liquid level in the tank should rise above a maximum filling level, the tank has an emergency overflow valve 81. It should preferably be arranged above the float (or floating body) 95. It releases an outlet when the liquid level exceeds the maximum filling level, such that the distance between the liquid level and the inlet decreases below a predetermined value.

The tank 10 has a nominal filling height, the liquid level 3 of which is indicated by a dashed line. Above the nominal filling level is a pressurized gas cushion. The inlet is therefore not in direct contact with the liquid 2 in the tank 10.

In its upper region, the tank 10 can have a gas connection nozzle 53, which is preferably connected to a reservoir for a germicidal gas, with interposition of at least one switching valve. Preferably, the reservoir is under pressure, such that possibly used germicidal gas can be refilled during operation.

If liquid is extracted via the outlet 30 from the lower region of the tank, a corresponding quantity flows in via the inlet. In order that as little as possible of the gas reaches the region of outlet and possibly escapes, the tank has a calming means preferably above the liquid level and/or dipping into the liquid. In the example shown, the calming means is attached to the tank wall and has a trough-shaped recess in the middle. The calming means absorbs the kinetic energy of the liquid inflowing via the inlet. Therefore, no jet penetrates into the liquid 2 deep beneath the liquid level, which jet could entrain gas bubbles to the region of the outlet 30. In the example shown, the calming means is porous, such that water collected above the liquid level can sink steadily and over a large area through the calming means in the direction of the liquid level. Alternatively and/or additionally, the liquid can also flow over the edge of the calming means. In another embodiment, the calming means is a float.

In order to prevent migration along the tank wall in the direction of inlet 20, UV lamps are arranged in the region of the gas cushion, here indicated as rods. They irradiate the tank wall and in particular an annular strip 18 of the tank wall, the surface of which is provided with a germ-inhibiting material or includes such material. Particularly preferred, the germ-inhibiting coating is a semiconductor coating, e.g. of titanium dioxide.

Figure 3:
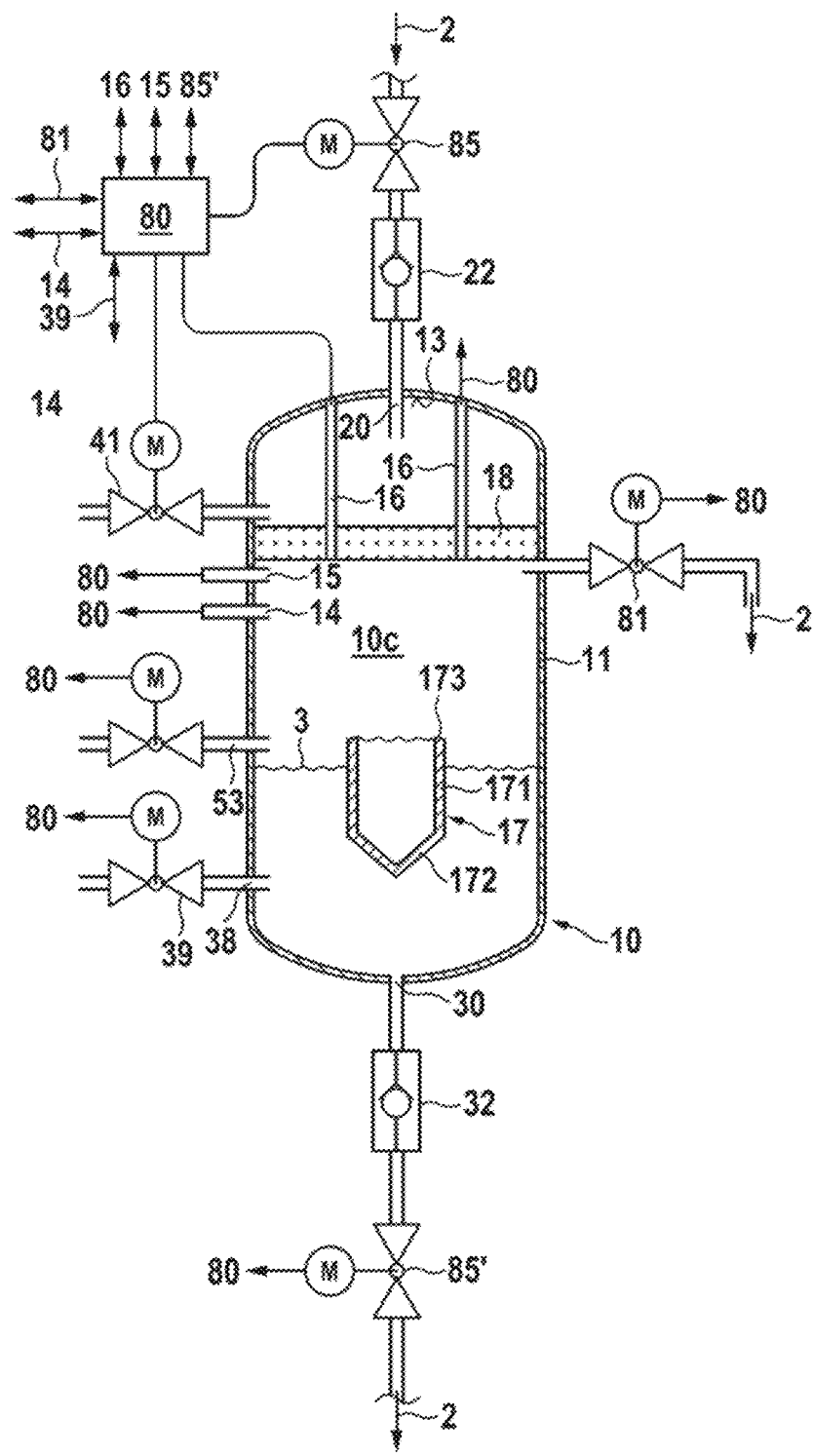
FIG. 3 shows a third system separation device.

FIG. 3 shows a further embodiment of the invention, and only differences to the above explained embodiment are discussed. Same or similar reference numerals are used to avoid repetitions, thus except of some obvious differences the description of FIG. 2 can be read as well on FIG. 3.

The system separation device in FIG. 3 comprises a receiving pot 17 as calming means 17. The receiving pot 17 is positioned in the reservoir and below the inlet 21. To avoid ambiguities, the receiving pot 17 preferably comprises a bottom wall 172 and a side wall 171 defining a rim 173. The rim 173 faces at least essentially upwards and encloses the receiving pots opening. Thus the receiving pot 17 is configured to receive liquid flowing from the inlet 21 via the gas cushion into the receiving pot 17. Bubbles generated by the liquid enter the receiving pot 17 rise to the liquid level, at last when the liquid pours over the rim 173. The bottom 172 of the receiving pot 17 absorbs the kinetic energy of the liquid literally falling down from the free inlet into the reservoir. The bottom thus and prevents a 'direct flow' towards the extraction point. Further, the bottom 172 has a tapered shape. Thereby, bubbles cannot agglomerate below the receiving pot. As soon as they reach a critical size, they rise upwards.

The rim 173 is slightly above the intended liquid level 3. It may as well be positioned slightly below or preferably at the intended liquid level 3. In operation the liquid level may vary, but by adding gas via gas inlet 53 or by releasing gas via outlet valve 41, the controller may ensure that the actual liquid level is within predefined boundaries close to the intended liquid level 3. As the liquid flows over the rim, the liquid's flow velocity can be slowed down and in addition the stream is directed towards the gas cushion, enabling gas bubbles to rise upwards and leave the liquid, i.e. to reenter the gas cushion. In short, the receiving pot enables to reduce the flow velocity of the liquid below the velocity with which the bubble rise up in the liquid. The diameter of the receiving pot is preferably larger that than the diameter of the inlet, e.g. twice as big or bigger, to thereby slow the flow over the rim down. The larger the diameter, the slower is the flow velocity of the liquid when passing over the rim and the less are bubbles removed with the liquid flow via the extraction point from the tank. The volume of the gas cushion thus essentially remains constant (assuming a constant pressure in the tank).

The system separation tank 10 of as depicted in FIG. 3 has an additional outlet 38 providing a release opening. The additional outlet 38 is preferably but not necessarily positioned below the intended liquid level and enables (is configured) to release liquid from the reservoir to the environment, e.g. into a wastewater system. The additional outlet 38 can be opened and closed by operating a control valve 39, as well referred to as release valve 39. The release valve is controlled by controller 80. If the controller 80 monitors a malfunction, e.g. of the UV-sources 16 or if the liquid level rises above the liquid level sensor 15, the controller 80 opens the release outlet 38, thereby establishing a liquid flow via the inlet 20. Thus, any germ would be flushed with the fluid flow 2 out of the inlet 20, before it can adhere to the surface. An upstream germ migration can be prevented or at least slowed down until the system separation device can be reviewed and repaired to avoid that a germ population that potentially entered the reservoir via the outlet 30 reaches an upstream branch of the upstream liquid system ("system 1") and thus infects other branches of the upstream liquid system. In one implementation, the release opening and the outlet are not in fluid communication with one another.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

It will be appreciated to those skilled in the art having the benefit of this disclosure that this invention is believed to provide system separation device. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS 1 system separation device
2 medium/liquid
3 liquid level
10 tank
10i tank interior
11 side wall of the tank
11a recess in the side wall
12 bottom wall of the tank
12i inner face of the bottom wall
13 top wall of the tank
13a recess in the top wall
14, 15 level sensor
16 UV light source
17 calming means e.g. receiving pot
171 side wall of receiving pot
172 bottom of receiving pot
173 rim of receiving pot
18 annular strip
20 liquid inlet
21 liquid supply pipe
21a, 21b sections of the liquid supply pipe
22 check valve
23 pressure reducer
24 regulated control valve
25 manometer
26 valve seat
27 valve body
30 liquid outlet
30a section of the liquid outlet
31 drain pipe
32 check valve
33 manometer
36 valve seat
37 valve body
38 second outlet/release outlet
39 second outlet control valve/release valve
40 ventilation device
41, 42 ventilation valves
50 pressure generation device
51 gas supply device
52 regulated shut-off valve
53 gas connection nozzle
60 safety trough
61 leakage sensor
70 pressure relief valve
80 regulation/control
81 emergency overflow valve
85 switching valve
85' switching valve
90 actuation means/rod
95 float or floating body

The invention claimed is:

1. A system separation device configured to be attached to a source of drinking water and comprising:
   a tank having a bottom and configured to hold liquid up to a predetermined liquid level in the tank,
   a gas inlet configured to deliver a flow of gas, under constant pressure, into the tank to fill a volume about the predetermined liquid level with gas and to prevent liquid in said tank from rising above the predetermined liquid level,
   a drinking water inlet in an upper region of the tank, said drinking water inlet configured to feed, in operation of the device, the tank with the drinking water from said source such that pressure of said gas in the volume is defined by operation of said drinking water inlet,
   a liquid outlet in a lower region of the tank, said outlet configured to forward the liquid from the tank,
   a UV light source disposed in operation of the separation device wholly above the predetermined liquid level and in said volume and configured to irradiate the drinking water inlet with UV light to prevent contamination of said drinking water inlet with contaminants located below said drinking water inlet to microbiologically separate said drinking water from said liquid held in the tank,
   and
   a receiving pot disposed in the tank below the drinking inlet
      to receive a flow of the drinking water falling down from the drinking water inlet into the tank and
      to absorb a kinetic energy of said flow.

2. The system separation device according to claim 1, wherein the tank has at least one filling level sensor configured to determine a level of liquid filling the tank during the operation thereof.

3. The system separation device according to claim 1, wherein the UV light source is configured to irradiate an annular region of an inner side of a wall of the tank, wherein the annular region is dimensioned to surround the drinking water inlet.

4. The system separation device according to claim 1, wherein the gas filling said volume comprises a germicidal gaseous substance at a first concentration that is higher than a second concentration, the second concentration being a concentration of said germicidal gaseous substance in air.

5. The system separation device according to claim 1, wherein a wall of the tank satisfies at least one of the following conditions:
   a) the wall contains a coating at at least one of (i) the inner side of the wall, (ii) a region of the drinking water inlet, and (iii) around the region of the drinking water inlet, wherein said coating includes a germ-inhibiting or germicidal material,
   and
   b) said wall consists of germ-inhibiting or germicidal material.

6. The system separation device according to claim 5, wherein the inner side carries a semiconductor material dimensioned as annular region on the inner side, and
wherein a band gap of the semiconductor material is smaller than energy of photons emitted by the UV light source during operation thereof.

7. The system separation device according to claim 6, wherein the semiconductor material comprises titanium oxide ($TiO_2$).

8. The system separation device according to claim 1, wherein the tank contains a non-water-soluble germicidal fluid substance, wherein a density of said substance is lower than a density of water.

9. The system separation device according to claim 1, wherein the tank has a release valve, a release opening below the predetermined liquid level configured to be controlled by the release valve, and a controller configured to open the release valve when said predetermined liquid level cannot be maintained in operation of the device.

10. The system separation device according to claim 9, wherein the controller is configured to monitor the operation of the system separation device and, in an event of a malfunction, to open the release opening and the inlet.

11. The system separation device according to claim 1, wherein the tank comprises a ventilation device.

12. The system separation device according to claim 1, further comprising:
   a sensor system configured to detect a distance separating a level of liquid, filling the tank, and the drinking water inlet,
   a compressor configured to deliver said flow of gas at said constant pressure into the tank, and
   a control circuitry configured to activate the compressor when the distance, detected by the sensor system, falls below a nominal value.

13. The system separation device according to claim 1, wherein a rim of the receiving pot is disposed above the predetermined liquid level.

14. The system separation device according to claim 1, wherein the UV light source is disposed to be separated from the liquid in said tank during the operation of the device.

* * * * *